United States Patent Office 2,901,392
Patented Aug. 25, 1959

2,901,392

ORGANIC MERCURY SOLUTIONS AND METHOD OF PREPARING THE SAME

Sylvan I. Cohen, Flushing, and Martin S. Frant, Ossining, N.Y., and Frank J. Sowa, Cranford, N.J.; said Cohen and said Frant assignors to Gallowhur Chemical Corporation, New York, N.Y., a corporation of New York No Drawing. Application July 14, 1954
Serial No. 443,424

2 Claims. (Cl. 167—30)

The present invention relates to stable solutions of phenyl mercury compounds particularly suited for application to articles such as nylon, nylon filaments and brushes, particularly toothbrushes having nylon bristles, and to the preparation of such solutions.

In our application Ser. No. 443,423, filed July 14, 1954, we have described and claimed stabilized organic mercury solutions and their preparation wherein the solutions are essentially composed of phenyl mercury lactate in lactic and formic acids with sufficient formic acid being present to provide free formic acid in the solutions. While these solutions as therein prepared are eminently satisfactory as regards their stability, their fungicidal, antiseptic or bacteriostatic activity, and for the treatment therewith of various articles, especially those composed of nylon or containing nylon components such as nylon bristles, we have now further discovered that superior results can be achieved by employing a solution composed of a different and simpler combination of constituents.

This invention is, accordingly, predicated upon our further important discovery that phenyl mercury formate in sufficient formic acid to provide an equivalent of mercury in the solution in the range of approximately 0.25–5%, preferably approximately 1%, produces outstanding results for the treatment of various articles, particularly those composed of nylon or having a nylon part or component, and that by following the practices of the present invention unusually excellent germistatic and germicidal results can be secured in an improved manner in which stabilization is not a problem.

In accordance with the present invention, and as a specific example thereof, phenyl mercury formate is dissolved in sufficient formic acid to produce a solution containing the equivalent of approximately 1% mercury. The phenyl mercury formate is produced by dissolving 1 mol of phenyl mercury hydroxide in approximately 10 mols of formic acid, heating to 70–80° C., filtering the resulting solution and precipitating the phenyl mercury formate in a large excess of water. The product is a white solid decomposing at about 140° C. and soluble to at least 1.5–2% in acetone and methanol.

We have further found that it is not necessary in every case to start with phenyl mercury formate since any phenyl mercury compound can be used which, with formic acid, produces phenyl mercury formate. Thus, in a further example of the invention, phenyl mercury hydroxide is dissolved at room temperature in sufficient formic acid to produce a phenyl mercury formate solution in formic acid containing the equivalent of 1% mercury.

A solution produced in accordance with the invention is then applied to the article to be treated therewith in the same manner as set forth in our aforesaid application Ser. No. 443,423, by immersing in, or otherwise subjecting the article to, a bath, dip or spray of the solution for a short period of time at ambient room temperature. Fully satisfactory results are achieved by a 1-minute immersion or treatment, but this depends somewhat upon the particular nature of the article and the time may generally range, therefore, from about 10 seconds to 60 seconds, although we have found that longer treatment up to 1 hour or more has no adverse result but is unnecessary. After treatment, the articles are dried under mild drying conditions or, where time permits, are allowed to dry under ambient temperature conditions. Drying is carried out by means of warm air currents or in a low-temperature drying oven.

The antiseptic activity of nylon toothbrush bristles processed in accordance with the invention was determined by appropriate tests using as the test organism *Micrococcus pyogenes* var. *aureus* and the results obtained are set forth in the following table, which table also includes, for comparative purposes, the combination of formic and lactic acids, lactic acid alone and the solvents methanol and acetone:

TABLE

*Antiseptic activity of nylon bristles processed with formulations of phenyl mercury compounds*

[Test organism: *Micrococcus pyogenes* var. *aureus*.]

| Treatment Formula | Zone of Inhibition in mms. after— | |
|---|---|---|
| | 24 hrs.' leaching | an additional 45 mins. dentifrice-brushing |
| phenyl mercury formate: | | |
| in methanol | a 4.5 x 12.5 | 4.9 x 9.3 |
| in acetone | 3.8 x 11.1 | 4.5 x 9.3 |
| in lactic acid | 1.4 x 9.7 | 0.4 x 2.1 |
| in formic acid | 11.8 x 16.5 | 13.1 x 16.1 |
| in formic-lactic acids | 7.1 x 14.6 | 4.4 x 9.4 |
| phenyl mercury hydroxide: | | |
| in formic acid | 11.6 x 16.8 | 13.1 x 16.4 | a The treated bristles were cut from toothbrushes to measure 0.5 x 8.0 mms. Each figure is an average of 8 replicate bristles.

The exceptionally large size of the zone of inhibition for phenyl mercury formate in formic acid and for phenyl mercury hydroxide in formic acid will be noted. The tests were carried out in the same manner and under the same conditions as the tests set forth in Table II of our aforesaid application Ser. No. 443,423, and have the meaning and significance there stated.

The articles treated with the solutions of this invention are the same as those set forth in our said application Ser. No. 443,423, and include nylon in any of its fabricated forms such as sheets, filaments and bristles, synthetic plastic materials such as butyrate resin and the usual plastics of which toothbrush heads and handles are made, as well as Siberian pig bristles.

When articles such as nylon in filamentary form or nylon brush bristles are immersed in or otherwise subjected to treatment with our present solutions, the same type of tenacious, durable chemical adhesion is obtained as in our aforesaid application, producing in this instance a chemically adherent deposit of phenyl mercury formate on and in the nylon and other articles. For the same reasons set forth in our said application, it has been found that there is no chemical reaction, combination or condensation taking place between the phenyl mercury formate and the nylon or other material and that the action is neither mere coating nor mere impregnation. While the precise nature of the mechanism involved is not presently known to or understood by us, our investigations, tests and examinations of the treated articles have made it clear that such mechanism is not based on chemical reaction or on mere coating or impregnation. The resistance to leaching of articles treated with a solution according to the present invention is at least as great as, and generally exceeds, the resistance to leaching of solutions essentially composed of phenyl mercury lactate in lactic and formic acids. The germistatic or fungicidal action is appreciably greater than that of the solution of phenyl mercury lactate in lactic and formic acids and not only the new solutions themselves but the articles treated therewith are characterized by great stability. The treated articles are non-toxic to animals and humans irrespective of the extent and frequency of use thereof.

As in our aforesaid application, the action is a selective one since not all phenyl mercury compounds can be utilized, but phenyl mercury formate or any phenyl mercury compound, such as phenyl mercury hydroxide, which, with formic acid, produces phenyl mercury formate may be employed. It has further been found that there is no objection to the presence of other components in the solutions provided that they do not alter the phenyl mercury formate present or prevent its formation. Thus, the solutions contain an organic mercury compound responding to the general formula R—Hg—X, wherein R is monophenyl, Hg is mercury and X is an anion capable of dissociating in solutions containing formic acid, and R—Hg—X is phenyl mercury formate or a phenyl mercury compound capable of forming phenyl mercury formate in solution with formic acid. The solution in each instance contains sufficient formic acid to provide a solution containing free formic acid and to produce the desired percentage equivalent of mercury in the range above set forth. The amount of formic acid to be used can be readily calculated in each instance. The formic acid employed is of 85% strength.

The term "nylon" is used herein in the same sense as in our aforesaid application Ser. No. 443,423 and means those synthetic fibres or materials commonly sold under that name and used for toothbrush bristles and particularly polymers of the hexamethylenediamine salt of sebacic or adipic acid, in the latter case being a super polymeric amide of protein-like structure used as a fibre and mold compound having a molecular weight of at least 10,000–25,000 and being represented by the following reaction scheme:

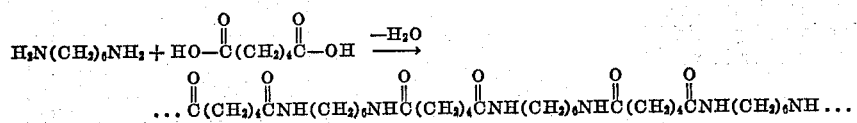

We claim:

1. An organic mercury solution for the durable antisepsis of nylon and synthetic plastics which consists essentially of phenylmercury formate in an amount of formic acid sufficient to reduce the concentration of phenylmercury formate to the extent that the equivalent of metallic mercury in the solution is in the range of 0.25 to 5%, the said solution, when applied directly to the nylon and synthetic plastic articles without pretreatment thereof, forming in and on the same a chemically adherent deposit of phenylmercury formate which penetrates and diffuses into the said nylon and synthetic plastic articles and is resistant to leaching therefrom.

2. An organic mercury solution for the durable antisepsis of nylon filaments and bristles which consists, essentially, of phenylmercury formate in an amount of formic acid sufficient to reduce the concentration of phenylmercury formate to the extent that the equivalent of metallic mercury in the solution is approximately 1%, the said solution, when applied directly to the nylon without pre-treatment of the nylon, forming in and on the nylon a chemically adherent deposit of phenylmercury formate which penetrates and diffuses into the said nylon and is resistant to leaching.

References Cited in the file of this patent

UNITED STATES PATENTS

| | | |
|---|---|---|
| 2,099,888 | Hill | Nov. 23, 1937 |
| 2,112,129 | Andersen | Mar. 22, 1938 |
| 2,411,815 | Sowa | Nov. 26, 1946 |
| 2,423,261 | Sowa | July 1, 1947 |
| 2,423,262 | Sowa | July 1, 1947 |
| 2,479,275 | Sowa | Aug. 16, 1949 |
| 2,507,299 | D'Alelio | May 9, 1950 |
| 2,637,677 | Dinerstein | May 5, 1953 |
| 2,754,241 | Schwerdle | July 10, 1956 |

FOREIGN PATENTS

| | | |
|---|---|---|
| 543,291 | Great Britain | Feb. 18, 1942 |

OTHER REFERENCES

Rayon and Synthetic Textiles, vol. 31, No. 5, May 1950, p. 91.